Figure 1:
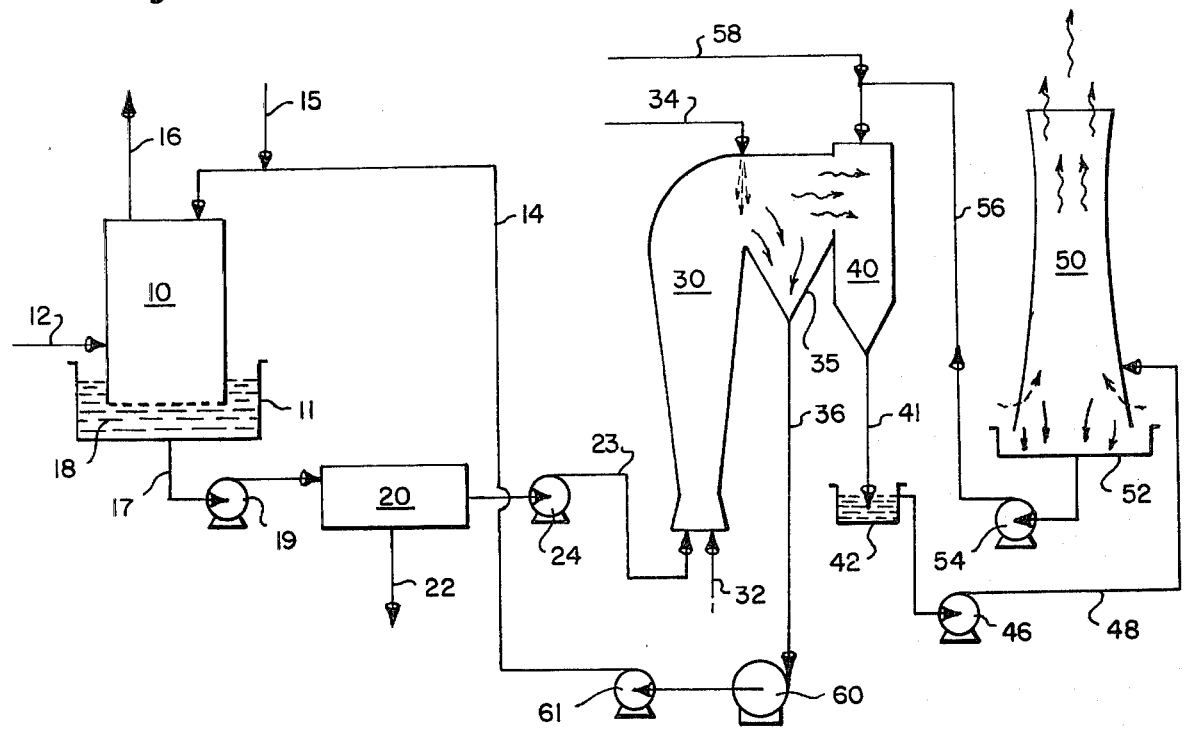

United States Patent [19]

Molini et al.

[11] 4,308,722
[45] Jan. 5, 1982

[54] RECOVERY OF ENTHALPY FROM HOT INDUSTRIAL EFFLUENTS

[76] Inventors: Alberto E. Molini, 5335 Beeler St., Pittsburgh, Pa. 15217; Clarence Zener, 3955 Bigelow Blvd., Pittsburgh, Pa. 15213

[21] Appl. No.: 46,668

[22] Filed: Jun. 8, 1979

[51] Int. Cl.³ .............................................. F01K 21/06
[52] U.S. Cl. ...................................... 60/646; 60/649; 60/657
[58] Field of Search .................. 60/641, 646, 657, 675, 60/649, 673

[56] References Cited

U.S. PATENT DOCUMENTS

| | | | |
|---|---|---|---|
| 3,805,515 | 4/1974 | Zener | 60/641 |
| 3,995,160 | 11/1976 | Zener et al. | 290/1 R |
| 4,026,111 | 5/1977 | Matthews | 60/641 |
| 4,083,189 | 4/1978 | Fetkovich | 60/641 |
| 4,149,385 | 4/1979 | Sheinbaum | 60/649 |
| 4,175,381 | 11/1979 | Scragg et al. | 60/649 |
| 4,192,145 | 3/1980 | Tamaka | 60/675 |
| 4,202,864 | 5/1980 | Spevack | 423/420 |

OTHER PUBLICATIONS

Cheremishinoff, Paul N. and Young, Richard A., Air Pollution Control and Design Handbook, Chp. 19, 26, 1977.
Sherwood, W. G., Advances in OTEC Ocean Eng., Contract No. EG-77-C-03-1684, 12/78.

Primary Examiner—A. Michael Chambers
Attorney, Agent, or Firm—Buell, Blenko, Ziesenheim & Beck

[57] ABSTRACT

Pollutants are removed from a hot industrial effluent after which enthalpy is recovered from the hot effluent by converting a working fluid into a foam in a flashing unit and using the foam to propel a turbine. For liquid effluents the effluent itself serves as the working fluid. For gaseous effluents the scrubbing fluid used to remove pollutants is used as the working fluid.

25 Claims, 2 Drawing Figures

RECOVERY OF ENTHALPY FROM HOT INDUSTRIAL EFFLUENTS

This invention relates to a method and apparatus for producing useful electrical power from hot gaseous or liquid industrial effluents and simultaneously minimizing their environmental impact. The preferred method and apparatus of the present invention recover as electricity a significant portion of the thermal energy in industrial effluents and concurrently clean and lower the temperature of the industrial effluent. Although we envision that our invention will be primarily used to obtain energy from waste liquids and gases, nonwaste products can also be used because our invention will operate with any hot fluid.

Present pollution abatement processes do not utilize the enthalpy of the effluents upon which they are used. The preferred method and apparatus of this invention recover much of the effluent's thermal energy in addition to removing pollutants. Consequently, they provide a more economically attractive means of pollution abatement and a more environmentally attractive means of producing electricity.

When used in conjunction with a fossil fuel fired plant the preferred method and apparatus of this invention permit the use of cheaper, lower quality fuels with high sulfur and ash content because pollutants are removed from the hot flue gas, enhance existing pollution control devices, eliminate the need for expensive, lined, tall smoke stacks because the gas emitted into the atmosphere is cleaner and cooler, recover large amounts of thermal energy that would otherwise be lost and can augment the power output of steam electric generating stations by up to 10%.

For gaseous effluents the preferred method and apparatus use well known direct contact scrubbing techniques wherein the gas enters one end of a scrubbing tower and flows toward its opposite end. The scrubbing tower can be a vertical or horizontal type. A liquid containing a scrubbing agent is fed at the top of the tower and falls downward making intimate contact with the moving gas. A suitable scrubbing agent to remove sulfur compounds would be calcium carbonate. As it contacts the gas the liquid is heated and picks up solid particles, sulfur compounds and $NO_x$ compounds from the gas. Cleaned and cooler gas is emitted from the opposite end of the tower and hot pollutant carrying liquid is collected at the tower's base. From there the hot liquid is passed through a cleaning unit to remove the solid particles that were removed from the hot effluent. Then the hot liquid is fed into a flashing unit where it is transformed into a foam-like mixture. The flashing unit is a chamber in which the exposure of the hot liquid to a vacuum gradient serves to continuously flash the hot liquid thus liberating some of its enthalpy and causing a fraction of it to evaporate. This unit preferably has an internal geometry similar to a convergent-divergent nozzle wherein the liquid flashes throughout its length. The foam-like mixture, hereinafter called foam, is a mixture of vapor and liquid similar to common foam and is formed by the continuous evaporation of a portion of the hot liquid in the flashing unit. The foam is permitted to move through the flashing unit. A turbine placed within the unit can be propelled by the moving foam or the foam's movement can be directed vertically through the flashing unit, separated into its liquid and vapor phase and the liquid used to propel a turbine. The movement of the foam to higher levels within the unit in essence changes some of the thermal energy of the hot liquid into potential energy of the foam. At the top of the unit the foam is broken into its liquid and vapor components. The liquid portion is guided to a standpipe that feeds a hydro-electric turbine generator thus achieving the convertion of some of the thermal energy acquired by the scrubbing fluid from the hot, dirty effluent into potential energy which is finally converted into electric energy. The vapors remaining from the broken foam proceed to a spray condenser where they are condensed and removed from the vacuum apparatus through the barometric leg of the spray condenser, thus maintaining the vacuum of the system.

For hot liquid effluents, the scrubbing step is avoided and the liquid passed directly into a cleaning system where its solid particulate pollutants are removed. The cleaned hot effluent is fed to the vacuum apparatus as described above where it is likewise flashed. The rapidly generated vapor will also form a vapor-liquid mixture ressembling a foam. The operation of the vacuum flashing apparatus will be the same as described above. The cleaning step may be avoided where the effluent or scrubbing fluid does not contain an undesirable level of pollutants.

In all embodiments of the invention a liquid is transformed into a foam to permit maximum utilization of the heat energy contained in the liquid. This foam is a mixture of vapor and intermingled liquid in which the overwhelming volume percentage is in the vapor phase and the overwhelming mass percentage is in the liquid phase. In the foam any motion of the vapor phase is accompanied by motion of the liquid phase. Therefore, the height to which the vapor rises causes a corresponding rise of the liquid. The maximum potential and kinetic energy of a foam can be calculated from well known and understood formulas.

The properties of the foam permit a maximum utilization of the enthalpy released during flashing. In a chamber having a pressure differential at opposite ends the vapor component will cause the foam to move from the high pressure area to a low pressure area. If the high pressure area is at the bottom of the chamber foam generated there will rise to the top. At the top of the chamber the foam can be separated into its liquid and vapor phases. The force of gravity will then cause the liquid to fall. The kinetic energy of the falling liquid can be used by conducting it over a water wheel type turbine connected to a generator. A pressure differential can be maintained in the chamber by keeping the top of it cooler than the hot liquid entering the bottom of the chamber.

Other details, objects and advantages of the invention will become apparent as a present preferred embodiment of the invention proceeds.

Figure 2:
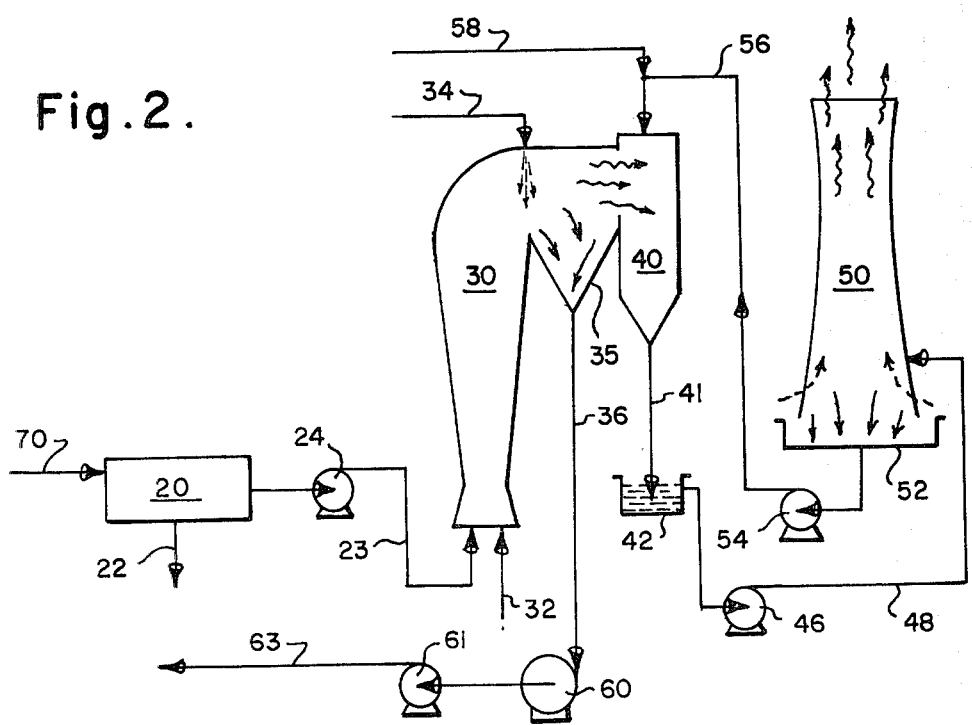

In the accompanying drawings, we have shown a present preferred embodiment of the invention in which:

FIG. 1 is a flow diagram showing a present preferred method and apparatus for use with gaseous effluents, and FIG. 2 is a flow diagram showing a present preferred method and apparatus for use with liquid effluents.

Referring to FIG. 1, hot gaseous industrial effluent is conducted through conduit 12 into the lower portion of a scrubbing tower 10 where it is cleansed of pollutants through contact with a scrubbing fluid which has been fed through conduit 14 into the top of the tower 10.

Numerous scrubbing fluids such as water, glycols, and glycerin can be used as the scrubbing fluid. Although water will serve as a suitable scrubbing fluid, higher-boiling organic liquids or silicon oils are preferable because they permit higher energy recovery rates. Whatever fluid is selected it is also necessary to add to it a sulfur trapping agent such as calcium carbonate to enable the fluid to remove the sulfur compounds from the effluent.

In the scrubbing tower 10 the gaseous effluent will flow counter-current to the scrubbing fluid coming into intimate contact with one another. During contact heat will be transferred from the effluent to the scrubbing fluid. Additionally, the pollutants in the effluent will pass to the fluid. Thereafter the cleansed and cooler effluent will be released from the top of the scrubbing tower through output 16 and the hotter pollution carrying fluid will be collected in a basin 11 at the base of the scrubbing tower. Sufficient fluid is kept in the basin to provide a liquid seal between it and the scrubbing tower thus preventing the escape of gaseous effluent through the bottom of the scrubbing tower.

The heated, pollutant carrying, scrubbing fluid 18 is pumped by pump 19 through a conduit 17 into an insulated cleaning system 20 where the pollutants are removed through output 22. The cleaning system may employ filtration, sedimentation or other known cleaning techniques. A combination of sedimentation to remove the sulfur compounds which will precipitate rapidly and filtration to remove the other pollutants is preferrable. The cleaning system is insulated to prevent heat loss from the fluid.

From the cleaning system 20 the still hot and cleansed fluid is pumped by pump 24 through pipe 23 into a flashing unit 30. A spray condenser 40 in the top of the flashing unit 30 keeps the top of the unit at a lower temperature than the hot fluid entering the bottom of the unit. This temperature differential causes a pressure differential between the top and bottom of the unit. When the fluid enters the bottom of the unit the pressure differential will cause it to flash into foam. Inlet means 32 is provided at the base of the tower 30 through which a foam inducing agent such as air or a surfactant can be introduced to prompt foam formation by the liquid. The foam will rise within the tower 30. When it has reached the top of the tower it is broken into its liquid and vapor components. We have found that a small amount of hexanol fed through input 34 can be used to break the foam.

The vapor component of the foam passes into a barometric leg spray condenser 40 where it is condensed into a liquid. If the vapor phase is water vapor, cool water is sprayed onto the vapor to condense it. If a scrubbing fluid other than water is being used, that same fluid to which some water has been added, can be used in the spray condenser. The condensed vapor and sprayed liquid are collected at the base of the barometric leg condenser 40 and piped into a catch pot 42 through pipe 41. The collected fluid is pumped by pump 46 through conduit 48 into a cooling tower 50. In the cooling tower the fluid is cooled mainly through the evaporation of some of the water it contains. Because this evaporation cooling will be minimal with high-boiling nonaqueous fluids, water must be added to them if such fluids are used as the scrubbing agent. Its heat having been transferred to the ambient air through the cooling tower, the cooled fluid is collected in a basin 52 at the base of the tower 50. From the basin, the fluid is pumped by pump 54 through pipe 56 to the spray condenser 40 for reuse. A make-up line 58 is provided to add fluid to the system when necessary.

The liquid phase is collected in the collector portion 35 of the flashing unit 30 and conveyed into standpipe 36. It falls through the standpipe 36 onto a water wheel or turbine 60. The falling liquid propels the turbine which is connected to a generator (not shown) that produces electricity. After passing over the turbine the fluid is pumped by pump 61 through conduit 14 to the scrubbing tower 10 for reuse. A make-up line 15 is provided to add fluid to the system as required. A surge tank can be added to the return line to provide a more constant liquid flow.

We have found that this embodiment is particularly useful for flue gases from fossil fuel fired furnaces. The flue gas entering the scrubbing tower is at a temperature ranging upward from 250° F. and contains solid particles, sulfur compounds and $NO_x$ compounds. In the scrubbing tower these pollutants are removed by the scrubbing fluid and the flue gas is cooled to a temperature of 95° F.–100° F. when it leaves the tower. The scrubbing fluid collected at the base of the tower will have a temperature of 140° F.–160° F. if water or a value near that of the entering flue gas if higher boiling point fluids are used. Little heat should be lost during the filtration process so the scrubbing fluid enters the flashing unit at approximately the same temperature. The fluid used in the spray condenser is at a temperature lower than 90° F. It is heated by the condensing vapor, to less than 110° F. degrees transferred to the cooling tower, and there cooled to below 90° F. The exact temperature it reaches is dependent upon the temperature and moisture content of the ambient air.

For two plants we have calculated that from 4% (for a low sulfur liquid fossil fuel fired steam generating plant of 500 MW) to 15% (for a coal fired steam generating plant of 1000 MW) of the flue gas waste heat can be recovered thereby increasing the overall generating capacity of the power plant by 1.8% to 10%.

FIG. 2 illustrates an application of the invention to liquid effluents. Here the effluent serves as the working fluid. The hot liquid polluted effluent is fed through input 70 into an insulated cleaning system 20 where the pollutants are removed. The cleaning system may employ filtration, sedimentation or other known cleaning techniques. These pollutants are expelled from the cleaning system for disposal through output 22. The cleaning system is insulated to prevent heat loss from the fluid.

In similar fashion the still hot and cleansed fluid is pumped through pipe 23 by pump 24 into flashing unit 30. As in the first embodiment a spray condenser 40 in the top of the flashing unit 30 keeps the top of the unit at a lower temperature than the hot fluid entering the bottom of the unit. This temperature differential causes a pressure differential between the top and bottom of the unit. When the fluid enters the bottom of the tower the pressure differential will cause it to flash into foam. Inlet means 32 is provided at the base of the unit 30 through which a foam inducing agent such as air or a surfactant can be introduced to prompt foam formation by the liquid. The foam rises within the unit 30. When it has reached the top the foam is broken into its liquid and vapor components. A breaking liquid can be fed through input 34 to break the foam.

The vapor phase of the foam is handled in the same fashion as in the first embodiment shown in FIG. 1. It is captured in a barometric leg spray condenser 40 from which it is conducted through conduit 41 into a catch pot 42 and then pumped by pump 46 through conduit 48 into cooling tower 50. Cooled fluid is collected in a basin 52 at the base of the tower 50. From the basin, the fluid is pumped by pump 54 through pipe 56 to the spray condensor 40 for reuse. A make-up line 58 is provided to add fluid to the system when necessary.

The liquid phase is conducted to standpipe 36 through which it falls. A water wheel or turbine 60 is provided at the base of standpipe 36 and propelled by the falling liquid. The turbine is connected to a generator (not shown) which produces electricity. After passing over the turbine the fluid is expelled by pump 61 through conduit 63.

While we have shown and described a present preferred embodiment of the invention and have illustrated a present preferred method of practicing the same, it is to be distinctly understood that the invention is not limited thereto but may be otherwise variously embodied within the scope of the following claims.

We claim:

1. A method for concurrently recovering enthalpy and removing pollutants from a hot gaseous industrial effluent comprising:
   a. spraying the hot effluent with a scrubbing fluid to entrap within the fluid pollutants from the effluent,
   b. collecting the scrubbing fluid,
   c. cleansing the entrapped pollutants from the scrubbing fluid,
   d. conducting the scrubbing fluid into a flashing unit having an inlet and outlet and operating with a pressure differential between its inlet and its outlet such that the differential will induce flow within it,
   e. forming the scrubbing fluid into a foam,
   f. permitting the foam to flow within the flashing unit,
   g. separating the foam into its liquid and vapor phases,
   h. conducting the liquid phase to a turbine means,
   i. recovering the liquid phase,
   j. condensing the vapor to maintain the pressure differential, and
   k. recovering the condensed vapor.

2. The method of claim 1 also comprising using the recovered liquid phase as the scrubbing fluid.

3. The method of claim 1 wherein the scrubbing fluid is water.

4. The method of claim 1 wherein the scrubbing fluid is a fluid selected from the group of organic liquids whose boiling point is above 212° F.

5. The method of claim 1 wherein the scrubbing fluid is a mixture comprised of (a) a material selected from the group of organic liquids whose boiling point is above 212° F.; and (b) water.

6. The method of claim 1 wherein the scrubbing fluid is a silicon oil.

7. The method of claim 1 wherein the scrubbing fluid fed into the scrubbing tower is a mixture comprised of:
   a. a silicon oil; and
   b. water.

8. The method of claim 5 or 7 also comprising injecting water into the scrubbing fluid immediately prior to conducting the fluid into the flashing unit.

9. A method for concurrently recovering enthalpy and removing pollutants from a hot liquid industrial effluent comprising:
   a. cleansing the hot effluent to remove pollutants therefrom,
   b. conducting the effluent into a flashing unit having an inlet and outlet and operating with a pressure differential between its inlet and outlet such that the differential will induce a flow of fluid within it,
   c. forming the effluent into a foam,
   d. permitting the foam to flow within the flashing unit,
   e. separating the foam into its liquid and vapor phases,
   f. conducting the liquid phase to a turbine means,
   g. recovering the liquid phase,
   h. conducting the vapor phase to a condenser for condensing the vapor,
   i. cooling the condensed vapor, and
   j. recovering the condensed vapor.

10. An apparatus for concurrently recovering enthalpy and removing pollutants from hot gaseous industrial effluents comprising:
    a. a scrubbing tower having (i) an input means and an output means for receiving and expelling the effluent (ii) an input means and output means for receiving and expelling a scrubbing agent,
    b. a cleaning unit for removing pollutants from the scrubbing agent which is expelled from the scrubbing tower,
    c. conduit means between the scrubbing tower and the cleaning unit for conducting expelled scrubbing agent from the scrubbing tower to the cleaning unit;
    d. a flashing unit operating with a pressure differential between its inlet and outlet in which the scrubbing agent can be formed into a foam, allowed to move, separated into its liquid and vapor phases and having means for separately expelling the liquid and vapor phases;
    e. conduit means between the cleaning unit and the flashing unit for conducting the scrubbing agent from the cleaning unit to the flashing unit,
    f. turbine means,
    g. conduit means between the flashing unit and turbine means for conducting the liquid phase to the turbine;
    h. conduit means between the turbine means and scrubbing tower for conducting the liquid phase from the turbine to the scrubbing tower, and
    i. means for collecting the vapor phase.

11. An apparatus for recovering energy and removing pollutants from hot liquid industrial effluents comprising:
    a. a cleaning unit for removing pollutants from the effluent,
    b. a flashing unit operating with a pressure differential between its inlet and outlet in which the scrubbing agent can be formed into a foam, allowed to rise, separated into its liquid and vapor phases and having means for separately expelling the liquid and vapor phases,
    c. conduit means between the cleaning unit and flashing unit for conducting the effluent from the cleaning unit to the flashing unit,
    d. turbine means,
    e. conduit means between the flashing and turbine means for conducting the liquid phase to the turbine,
    f. conduit means from the turbine means for expelling the liquid phase; and
    g. means for collecting the vapor phase.

12. The apparatus of claim 10 or 11 wherein the means for collecting the vapor phase is a barometric leg spray condenser.

13. The apparatus of claim 12 also comprising:
   a. a cooling tower;
   b. first conduit means between the barometric leg spray condenser and the cooling tower for conducting fluid from the spray condenser to the cooling tower; and
   c. second conduit means between the cooling tower and the spray condenser for conducting fluid from the cooling tower to the spray condenser.

14. The apparatus of claim 13 also comprising a catch pot between the spray condenser and the cooling tower.

15. The apparatus of claim 10 or 11 wherein the flashing unit has an internal configuration of a convergent-divergent nozzle.

16. The apparatus of claim 13 also comprising input means connected to the first conduit means for adding water to the fluid before it enters the cooling tower.

17. The method of claim 9 also comprising injecting water into the scrubbing fluid immediately prior to conducting the fluid into the flashing unit.

18. A method for recovering enthalpy from a hot gas comprising:
   a. spraying the hot gas with a fluid,
   b. collecting the fluid,
   c. conducting the fluid into a flashing unit having an inlet and an outlet and operating with a pressure differential between its inlet and its outlet such that the differential will induce flow within the flashing unit,
   d. forming the fluid into a foam,
   e. permitting the foam to flow within the flashing unit,
   f. separating the foam into its liquid and vapor phases,
   g. conducting the liquid phase to a turbine means,
   h. recovering the liquid phase,
   i. condensing the vapor to maintain the pressure differential, and
   j. recovering the condensed vapor.

19. The method of claim 18 also comprising using the recovered liquid phase as the fluid.

20. The method of claim 18 wherein the fluid is water.

21. The method of claim 18 wherein the fluid is a material selected from the group of organic liquids whose boiling point is above 212° F.

22. The method of claim 18 wherein the fluid is a mixture comprised of (a) material selected from the group of orgainic liquids whose boiling point is above 212° F.; and (b) water.

23. The method of claim 18 wherein the fluid is a silicon oil.

24. The method of claim 18 wherein the fluid is a mixture comprised of:
   a. a silicon oil, and
   b. water.

25. The method of claim 22 or 24 also comprising injecting water into the fluid immediately prior to conducting the fluid into the flashing unit.

* * * * *

UNITED STATES PATENT AND TRADEMARK OFFICE
CERTIFICATE OF CORRECTION

PATENT NO. : 4,308,722

DATED : January 5, 1982

INVENTOR(S) : ALBERTO E. MOLINI and CLARENCE ZENER

It is certified that error appears in the above-identified patent and that said Letters Patent are hereby corrected as shown below:

Column 1, line 26, "preferred" should be deleted.

Claim 10, column 6, line 24, "scrubbing agent" should be --effluent--.

Claim 11, column 6, lines 54-55, "scrubbing agent" should be --effluent--.

Signed and Sealed this

First Day of June 1982

[SEAL]

Attest:

GERALD J. MOSSINGHOFF

Attesting Officer

Commissioner of Patents and Trademarks